US011037532B2

(12) United States Patent
Fukazawa et al.

(10) Patent No.: US 11,037,532 B2
(45) Date of Patent: Jun. 15, 2021

(54) INFORMATION PROCESSING APPARATUS AND INFORMATION PROCESSING METHOD

(71) Applicant: SONY CORPORATION, Tokyo (JP)

(72) Inventors: Ryo Fukazawa, Kanagawa (JP); Tomohisa Tanaka, Tokyo (JP); Tsubasa Tsukahara, Tokyo (JP); Akane Yano, Tokyo (JP); Kenji Sugihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/072,429

(22) PCT Filed: Nov. 18, 2016

(86) PCT No.: PCT/JP2016/084361
§ 371 (c)(1),
(2) Date: Jul. 24, 2018

(87) PCT Pub. No.: WO2017/138212
PCT Pub. Date: Aug. 17, 2017

(65) Prior Publication Data
US 2019/0066630 A1 Feb. 28, 2019

(30) Foreign Application Priority Data
Feb. 8, 2016 (JP) .............................. JP2016-022025

(51) Int. Cl.
*G09G 5/38* (2006.01)
*G06F 3/0481* (2013.01)
(Continued)

(52) U.S. Cl.
CPC ........... *G09G 5/38* (2013.01); *G02B 27/0172* (2013.01); *G06F 3/0481* (2013.01); *G06F 3/14* (2013.01);
(Continued)

(58) Field of Classification Search
None
See application file for complete search history.

(56) References Cited

U.S. PATENT DOCUMENTS 8,957,916 B1 * 2/2015 Hedman ................. G09G 3/003
345/633
9,813,882 B1 * 11/2017 Masterman ............. H04W 4/12
(Continued)

FOREIGN PATENT DOCUMENTS

EP          2981070 A1    2/2016
JP       2002-268621 A    9/2002
(Continued)

OTHER PUBLICATIONS

International Search Report and Written Opinion of PCT Application No. PCT/JP2016/084361, dated Jan. 24, 2017, 08 pages of ISRWO.

(Continued)

*Primary Examiner* — David H Chu
(74) *Attorney, Agent, or Firm* — Chip Law Group

(57) ABSTRACT

An information processing apparatus includes a determination unit configured to determine an output explicitness level of notification information to a user, and an output control unit configured to perform control such that the notification information is output in an output mode according to the determined output explicitness level. The output control unit performs control such that the notification information is output in a display mode of assimilating the notification information into a display environment in accordance with the output explicitness level.

11 Claims, 8 Drawing Sheets

(51) Int. Cl.

| | |
|---|---|
| *G09G 5/00* | (2006.01) |
| *H04N 5/64* | (2006.01) |
| *G06F 3/14* | (2006.01) |
| *G09G 5/36* | (2006.01) |
| *G06F 3/147* | (2006.01) |
| *G02B 27/01* | (2006.01) |
| *G06F 3/16* | (2006.01) |
| *G06F 3/0484* | (2013.01) |
| *G09G 5/02* | (2006.01) |
| *G09G 5/373* | (2006.01) |

(52) U.S. Cl.
CPC ............... *G06F 3/147* (2013.01); *G06F 3/16* (2013.01); *G09G 5/00* (2013.01); *G09G 5/36* (2013.01); *H04N 5/64* (2013.01); *G02B 2027/014* (2013.01); *G02B 2027/0178* (2013.01); *G06F 3/04817* (2013.01); *G06F 3/04842* (2013.01); *G09G 5/02* (2013.01); *G09G 5/373* (2013.01); *G09G 2354/00* (2013.01)

(56) References Cited

U.S. PATENT DOCUMENTS

| | | | | |
|---|---|---|---|---|
| 10,127,731 B1* | 11/2018 | Ozery | ................. | G01S 5/22 |
| 2004/0010808 A1* | 1/2004 | deCarmo | ........... | H04N 7/17318 |
| | | | | 725/139 |
| 2004/0056870 A1 | 3/2004 | Shimoyama et al. | | |
| 2005/0285878 A1* | 12/2005 | Singh | ................ | H04M 1/72544 |
| | | | | 345/633 |
| 2011/0267374 A1* | 11/2011 | Sakata | ................... | G06F 3/013 |
| | | | | 345/672 |
| 2013/0194164 A1* | 8/2013 | Sugden | ................... | G06F 3/167 |
| | | | | 345/8 |
| 2013/0307762 A1* | 11/2013 | Ashbrook | ................ | G06F 3/13 |
| | | | | 345/156 |
| 2014/0118272 A1* | 5/2014 | Gunn | ................... | G06F 3/0346 |
| | | | | 345/173 |
| 2014/0243027 A1* | 8/2014 | Gupta | ................... | H04L 69/22 |
| | | | | 455/466 |
| 2014/0268353 A1* | 9/2014 | Fujimura | ............... | G02B 27/01 |
| | | | | 359/630 |
| 2014/0300775 A1* | 10/2014 | Fan | .................... | H04N 1/32128 |
| | | | | 348/231.3 |
| 2015/0170482 A1 | 6/2015 | Soni et al. | | |
| 2015/0177970 A1* | 6/2015 | Choi | ..................... | G06F 3/0488 |
| | | | | 715/752 |
| 2016/0027215 A1* | 1/2016 | Burns | .................... | G06F 3/011 |
| | | | | 345/419 |
| 2016/0055677 A1* | 2/2016 | Kuffner | ................ | B62D 57/032 |
| | | | | 345/633 |
| 2016/0062968 A1* | 3/2016 | Umapathy | ............. | G06Q 10/10 |
| | | | | 715/752 |
| 2017/0099592 A1* | 4/2017 | Loeb | .................... | G06Q 10/107 |
| 2017/0149795 A1* | 5/2017 | Day, II | .................. | H04L 63/101 |
| 2017/0163578 A1* | 6/2017 | Deluca | ................... | H04W 4/90 |
| 2017/0192620 A1* | 7/2017 | Kim | ...................... | G06F 3/0481 |
| 2017/0243465 A1* | 8/2017 | Bourne, Jr. | ...... | G06Q 10/06314 |
| 2017/0329750 A1* | 11/2017 | Kazama | ................ | G06F 17/241 |
| 2018/0047212 A1* | 2/2018 | Long | ................ | G08B 13/19684 |
| 2018/0101223 A1* | 4/2018 | Ishihara | ................ | G06T 19/006 |
| 2018/0239136 A1* | 8/2018 | Ishikawa | ............ | G02B 27/0179 |

FOREIGN PATENT DOCUMENTS

| | | |
|---|---|---|
| JP | 2006-229652 A | 8/2006 |
| JP | 2010-079121 A | 4/2010 |
| WO | 02/073954 A1 | 9/2002 |

OTHER PUBLICATIONS

Office Action for JP Patent Application No. 2017-566523, dated Oct. 27, 2020, 04 pages of Office Action.

Office Action for CN Patent Application No. 201680080710.7, dated Nov. 27, 2020, 08 pages of Office Action and 11 pages of English Translation.

\* cited by examiner

FIG. 4
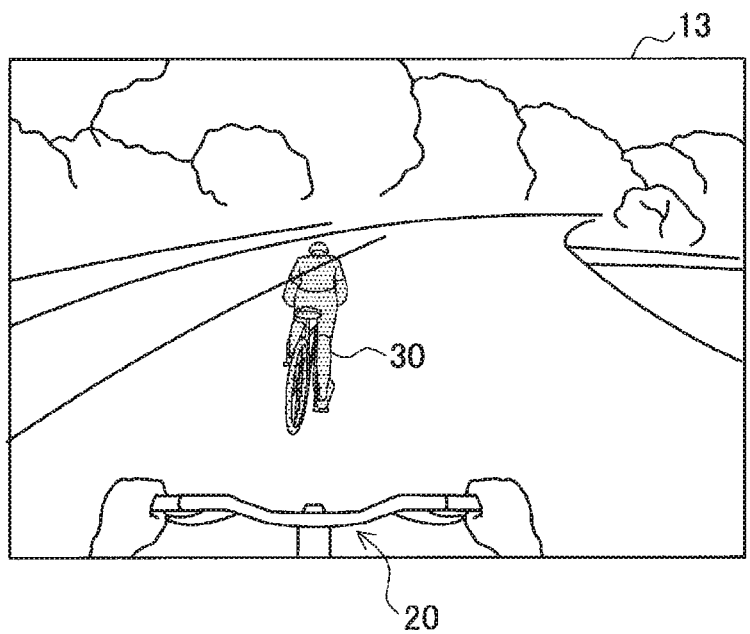
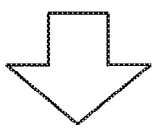
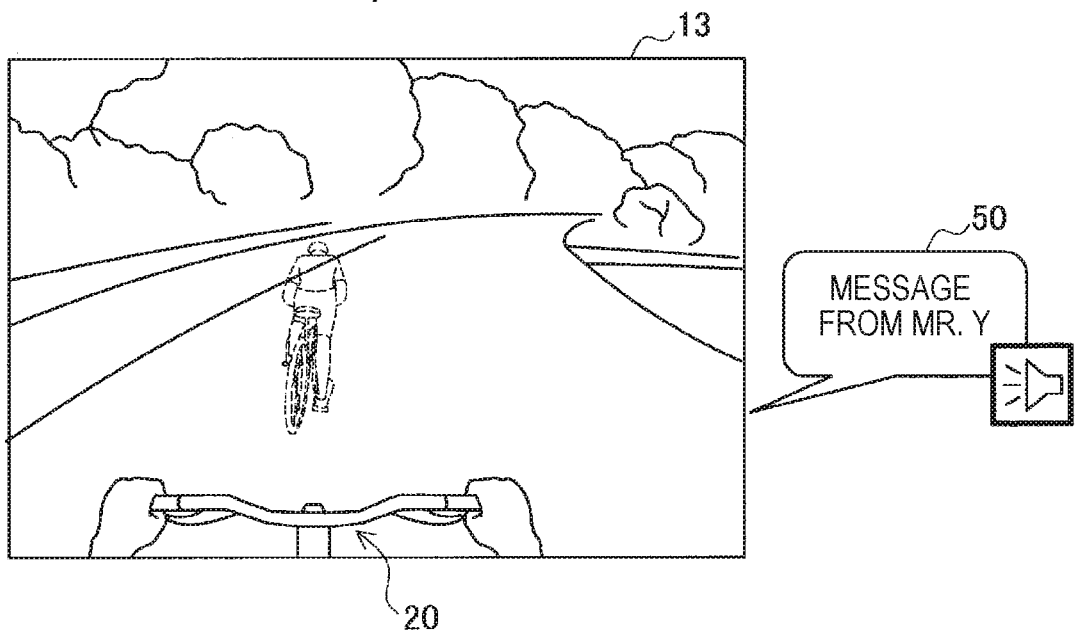

FIG. 6
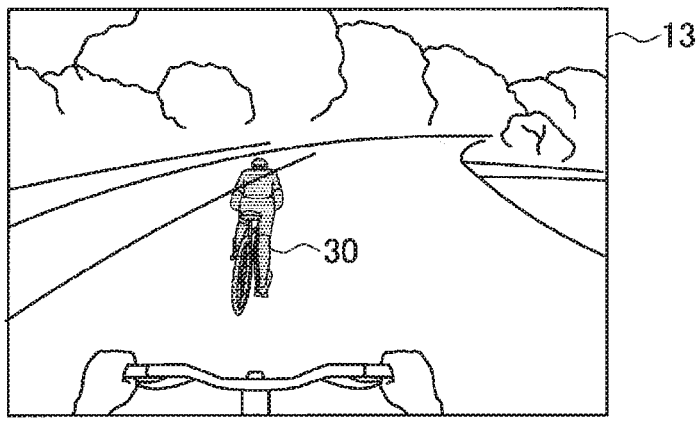
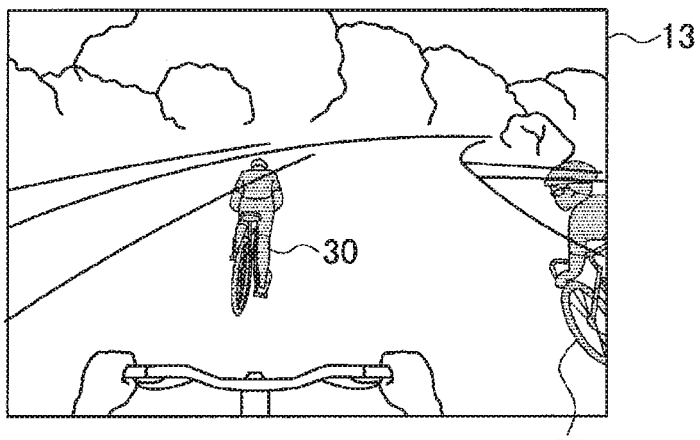
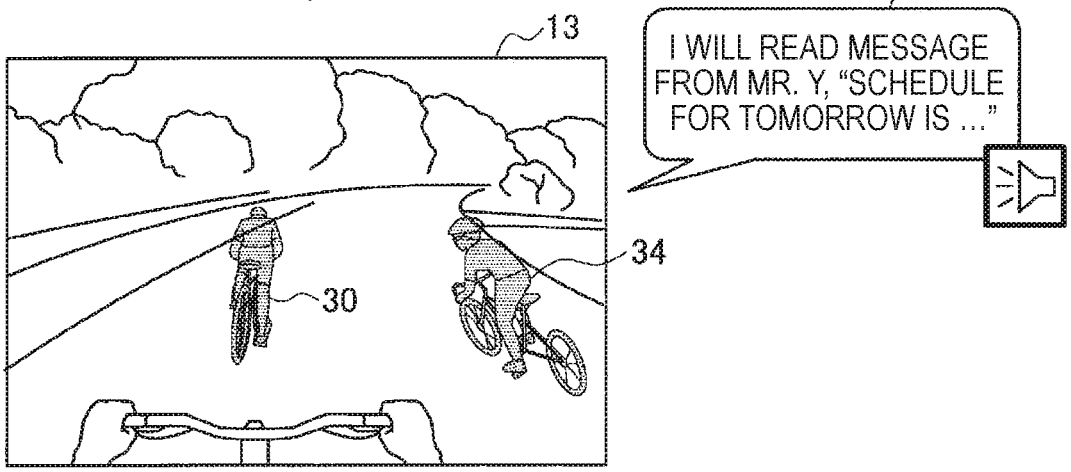

FIG. 7
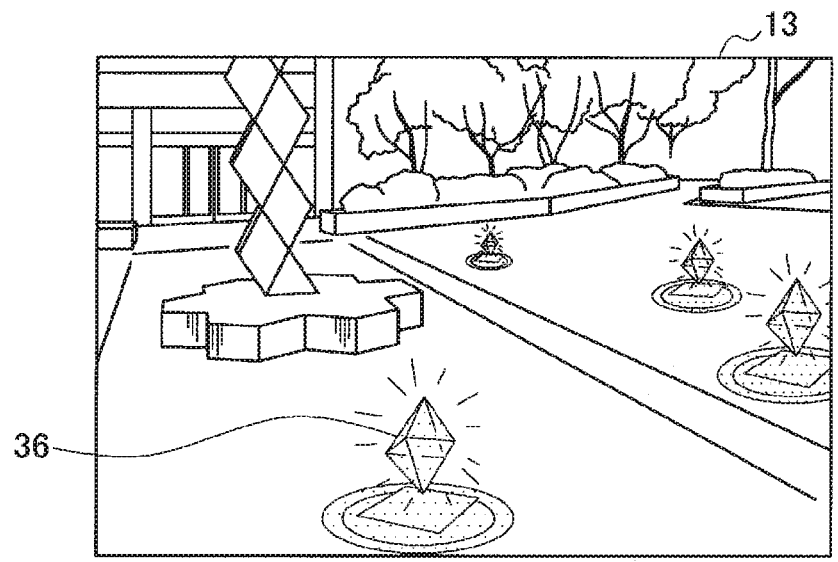
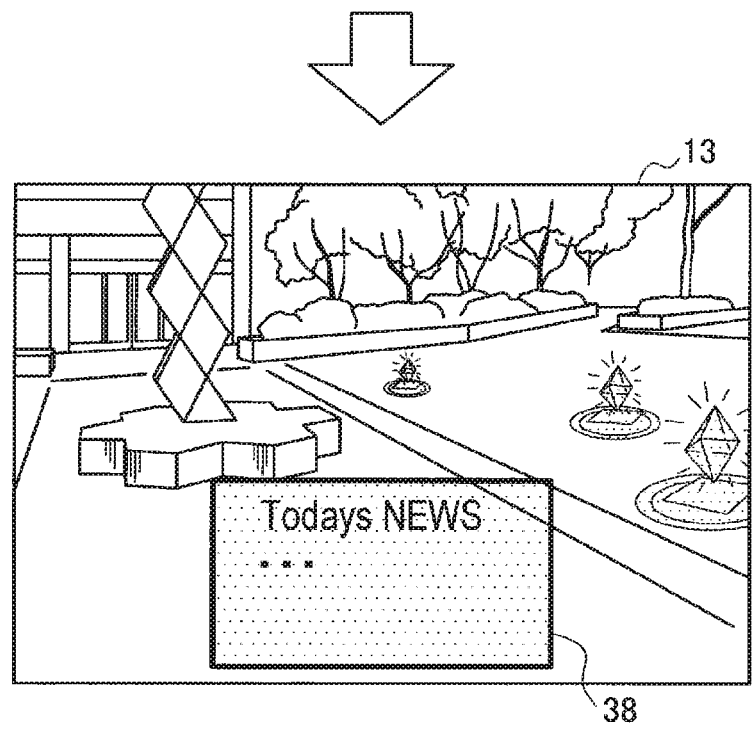

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/084361 filed on Nov. 18, 2016, which claims priority benefit of Japanese Patent Application No. JP 2016-022025 filed in the Japan Patent Office on Feb. 8, 2016. Each of the above-referenced applications is hereby incorporated herein by reference in its entirety.

TECHNICAL FIELD

The present disclosure relates to an information processing apparatus, an information processing method, and a program.

BACKGROUND ART

In recent years, a head mounted display (hereinafter, also referred to as an "HMD") provided with an operation device has been developed. The HMD which has a display located in front of eyes of a user when the HMD is worn on the head of the user, displays a display object in front of the user. Such an HMD includes a non-transmissive display or a transmissive display.

In the case of a transmissive display, the above-described display object is displayed while the display object is superimposed on real space which can be viewed through the display. For example, in an HMD in the following Patent Literature 1, a technology is disclosed which notifies a user of content (displaying a thumbnail image of content) such as a movie corresponding to a current location of a user through a display.

CITATION LIST

Patent Literature
    Patent Literature 1: JP 2014-90386A

DISCLOSURE OF INVENTION

Technical Problem

Here, a push notification in an information processing apparatus is mostly expressed with a method using a graphical user interface (GUI) such as a dialog box and a status bar. However, if such an expression method is used in a transmissive display, information is displayed in front of the eyes or in the center of a field of view of the user, which results in that space in front of the eyes is covered, and there is a possibility that behavior of the user may be inhibited, or displayed information does not fit in a surrounding environment, and a world view of running application may be harmed.

Therefore, the present disclosure proposes an information processing apparatus, an information processing method and a program which can improve usability by outputting notification information in an output style in accordance with an output explicitness level.

Solution to Problem

According to the present disclosure, there is provided an information processing apparatus including: a determination unit configured to determine an output explicitness level of notification information to a user; and an output control unit configured to perform control such that the notification information is output in an output mode according to the determined output explicitness level. The output control unit performs control such that the notification information is output in a display mode of assimilating the notification information into a display environment in accordance with the output explicitness level.

According to the present disclosure, there is provided an information processing method including, by a processor: determining an output explicitness level of notification information to a user; and performing control such that the notification information is output in an output mode according to the determined output explicitness level. The control includes performing control such that the notification information is output in a display mode of assimilating the notification information into a display environment.

According to the present disclosure, there is provided a program causing a computer to function as: a determination unit configured to determine an output explicitness level of notification information to a user; and an output control unit configured to perform control such that the notification information is output in an output mode according to the determined output explicitness level. The output control unit performs control such that the notification information is output in a display mode of assimilating the notification information into a display environment in accordance with the output explicitness level.

Advantageous Effects of Invention

As described above, according to the present disclosure, it is possible to improve usability by outputting notification information in an output style in accordance with an output explicitness level.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram explaining a second output mode according to the present embodiment.

FIG. 6 is a diagram explaining a fourth output mode according to the present embodiment.

FIG. 7 is a diagram explaining a fifth output mode according to the present embodiment.

MODE(S) FOR CARRYING OUT THE INVENTION

Figure 1:
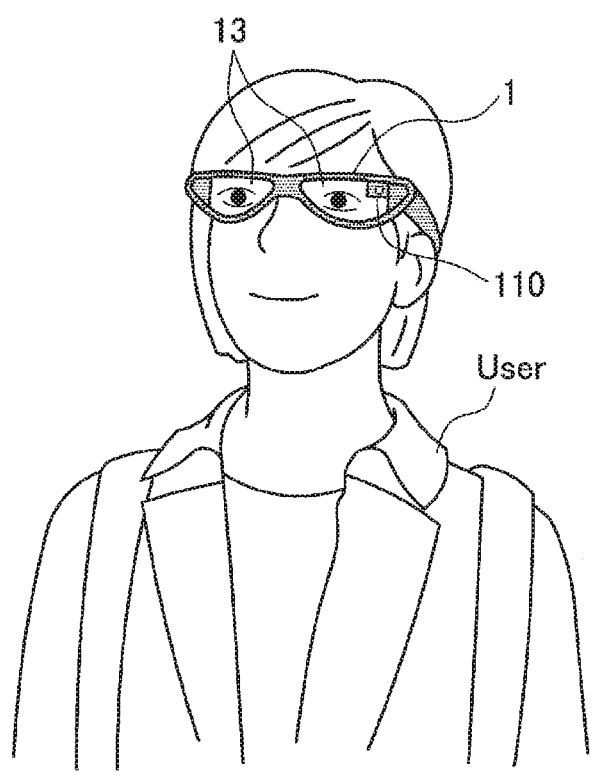
FIG. 1 is a diagram explaining outline of an information processing apparatus according to an embodiment.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, description will be provided in the following order.
1. Outline of information processing apparatus according to one embodiment of the present disclosure
2. Configuration of information processing apparatus
3. Operation processing
4. Output examples of notification information
4-1. Example of explicit output
4-2. Examples of output assimilated into environment
5. Conclusion

1. Outline of Information Processing Apparatus according to One Embodiment of the Present Disclosure First, outline of an information processing apparatus according to an embodiment of the present disclosure will be described. FIG. 1 is a diagram explaining outline of an information processing apparatus 1 according to the present embodiment. As illustrated in FIG. 1, the information processing apparatus 1 according to the present embodiment is realized with, for example, a glasses-type head mounted display (HMD) mounted on the head of a user. A display unit 13 corresponding to lenses of the glasses located in front of eyes of the user when the user wears the information processing apparatus 1 may be a see-through type display unit or a non-see-through type display unit. The information processing apparatus 1 displays a display object at the display unit 13, thereby can present the display object ahead in the line of sight of the user. Further, the HMD which is one example of the information processing apparatus 1 is not limited to one which presents an image to both eyes, but may be one which displays an image only at one eye. For example, the HMD may be a one-eye type in which the display unit 13 which displays an image at one eye is provided.

Further, an outward camera 110 which shoots the line of sight direction of the user, that is, an external direction when the user wears the information processing apparatus 1 is provided at the information processing apparatus 1. Still further, although not illustrated in FIG. 1, various kinds of sensors such as an inward camera which shoots the eyes of the user when the user wears the information processing apparatus 1 and a microphone (hereinafter, referred to as a "mike") are provided at the information processing apparatus 1. There may be provided a plurality of outward cameras 110 and inward cameras. Note that when there are a plurality of outward cameras 110, it is possible to obtain a depth image (distance image) through parallax information, so that it is possible to sense the surrounding environment.

Note that the shape of the information processing apparatus 1 is not limited to the example illustrated in FIG. 1. For example, the information processing apparatus 1 may be an HMD of a head-band type (in which the information processing apparatus 1 is worn with a band running over the whole circumference of the head or with a band also running the top of the head as well as the side of the head) or an HMD of a helmet type (in which a visor portion of the helmet corresponds to a display). Further, the information processing apparatus 1 may be realized with a wearable apparatus such as a wristband type wearable apparatus (for example, a smart watch, including a case where there is a display or there is no display), a headphone type wearable apparatus (with no display) and a neckphone type wearable apparatus (which is worn around the neck, including a case where there is a display or there is no display).

Further, because the information processing apparatus 1 according to the present embodiment is realized with the wearable apparatuses as described above and can be worn by the user, it is assumed that operation is input in various states such as when the user stops, as well as, when the user walks, when the user runs, and when the user rides a bike, or the like. Therefore, the information processing apparatus 1 includes various input methods such as sound input, gesture input using hand or head and input using the line of sight, in addition to buttons, switches (examples of operation members), or the like.

Here, if the user is notified of notification information such as push notification using a display method in related art which uses a GUI such as a dialog box and a status bar, the information is displayed in front of the eyes or in the center of the field of view of the user, which results in that space in front of the eyes is covered, and there is a possibility that behavior of the user may be inhibited, or the displayed information does not fit in a surrounding environment and a world view of running application may be harmed.

Therefore, the information processing apparatus 1 according to the present embodiment enables improvement of usability by outputting notification information in an output style in accordance with an output explicitness level. Specifically, the information processing apparatus 1 switches an output mode such as a notification output method (display, sound), a display style and a location where a notification is put (display position) in accordance with characteristics of notification information.

The outline of the information processing apparatus 1 according to the present embodiment has been described above. Subsequently, a configuration of the information processing apparatus 1 according to the present embodiment will be described with reference to FIG. 2.

2. Configuration of Information Processing Apparatus

Figure 2:
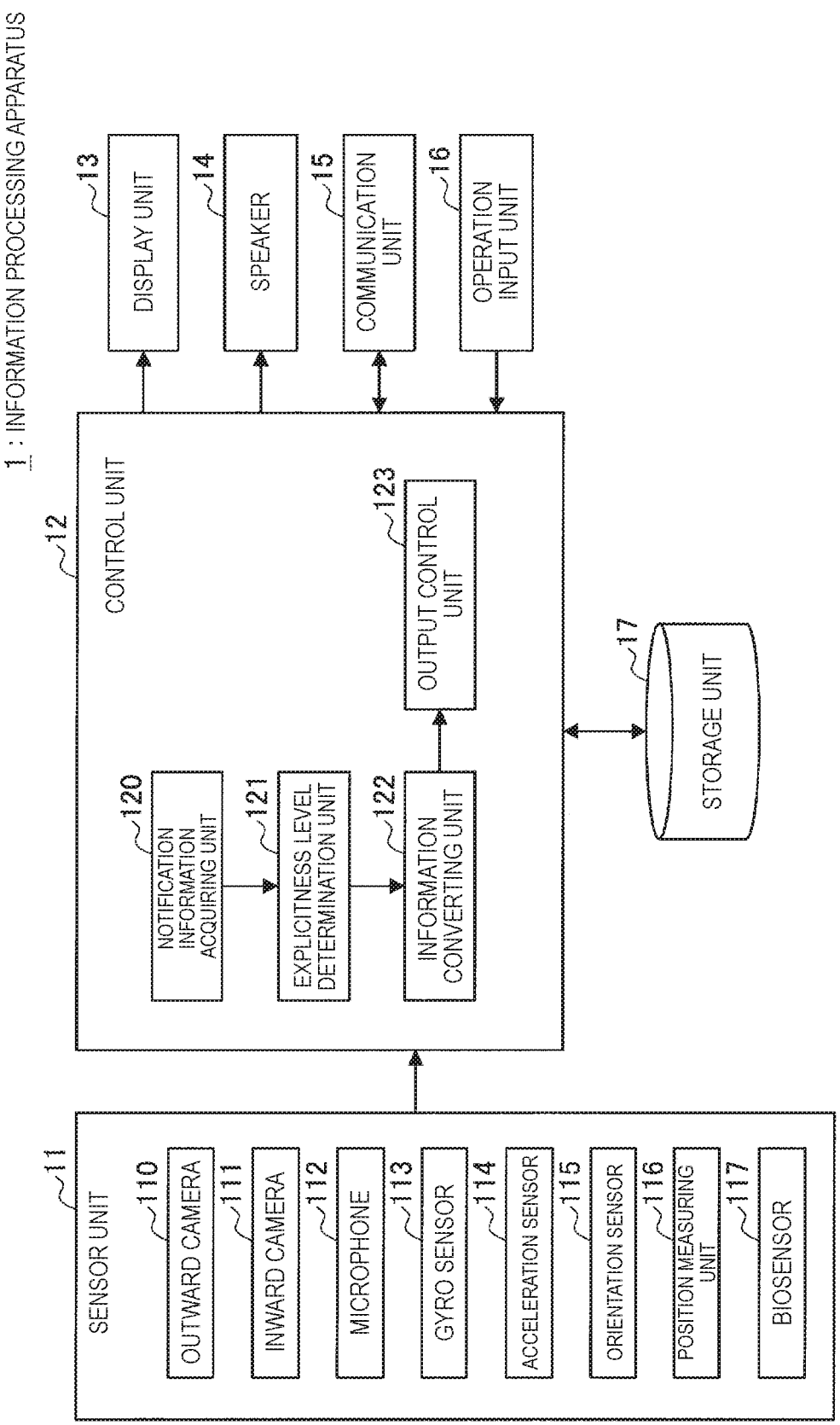
FIG. 2 is a block diagram illustrating an example of a configuration of the information processing apparatus according to the present embodiment.

FIG. 2 is a block diagram illustrating an example of the configuration of the information processing apparatus 1 according to the present embodiment. As illustrated in FIG. 2, the information processing apparatus 1 has a sensor unit 11, a control unit 12, a display unit 13, a speaker 14, a communication unit 15, an operation input unit 16, and a storage unit 17.

(Control Unit 12)

The control unit 12 which functions as an arithmetic processing unit and a control apparatus, controls the whole operation within the information processing apparatus 1 according to various kinds of programs. The control unit 12 is, for example, realized with electronic circuits such as a central processing unit (CPU) and a microprocessor. Further, the control unit 12 may include a read only memory (ROM) which stores a program, an operation parameter, or the like, to be used and a random access memory (RAM) which temporarily stores a parameter, or the like, which changes as appropriate.

Further, as illustrated in FIG. 2, the control unit 12 according to the present embodiment functions as a notification information acquiring unit 120, an explicitness level determination unit 121, an information converting unit 122 and an output control unit 123.

The notification information acquiring unit 120 acquires notification information to the user, which is, so-called push notification information.

The explicitness level determination unit 121 determines characteristics, that is, an explicitness level (output explicitness level) of the notification information acquired by the notification information acquiring unit 120 and outputs a determination result to the information converting unit 122. In the present embodiment, as the explicitness level, for example, a degree of importance or a degree of urgency of the notification information may be used, or the explicitness level may be calculated on the basis of the degree of importance and the degree of urgency.

As the degree of importance of the notification information, for example, those indicated in the following Table 1 are assumed.

TABLE 1

| | |
|---|---|
| ▲ High | Error (Fatal Error): information which is related to occurrence of fatal matters and which needs to be reliably delivered even if user behavior is interrupted |
| | Alarm (Error): information which is related to a problem which is not fatal, but which is desired to be delivered to the user |
| Degree of importance | Notification (Notification): Information which is related to matters which will not become a problem, but which should be delivered to the user |
| | Reference information (Information): Information which is useful for the user, but which is not necessarily required to be delivered |
| | Record (Log): information which is merely a record and which is not basically required to be delivered. For example, an application activation log, a traveling log, or the like. |
| ▼ Low | |

Further, as the degree of urgency of the notification information (request regarding a timing or time at which information is desired to be delivered), for example, those indicated in the following table 2 are assumed.

TABLE 2

| | |
|---|---|
| ▲ High | Urgent notification: information which the user should be necessarily reminded so as to prevent the user from missing the information at designated time. For example, an error notification, an alarm, or the like. |
| | Steady notification, continuous state notification: information which can be confirmed at any given time. Information which can be confirmed so as to prevent change of a state from being missed. For example, a device status, user vital, navigation, or the like. |
| Degree of urgency | Regular notification, reference information notification: information which is only required to be confirmed when the user has enough time. For example, remind us of e-mail message, direct mail (DM), news, weather, or the like. |
| | Notification regarding location and object: information regarding a current location of the user or an object which is being watched/picked up by the user. For example, explanation of a location and an object, or the like. |
| ▼ Low | |

The information converting unit 122 has a function of determining an output mode of notification information in accordance with the explicitness level determined by the explicitness level determination unit 121 (specifically, for example, the degree of importance, the degree of urgency, a state of the user, a surrounding environment of the user, device conditions, or the like), and converting the notification information into the output mode. The "output mode" includes various kinds of parameters relating to output such as an output method (display, sound, vibration, or the like), a display style (explicit display, display fit in (assimilated into) an environment, or the like), and a position where information is put (in front of the eyes of the user, around the user, within the scenery, or the like). Note that, in the case where the output mode is "display output", various kinds of parameters relating to display will be referred to as a display mode, while, in the case where the output mode is "sound output", various kinds of parameters relating to sound output will be referred to as a sound output mode. The information converting unit 122 may convert the notification information into an explicit output mode in the case where the output explicitness level exceeds a predetermined threshold and may convert the notification information into an output mode in which the notification information is assimilated into a display environment in the case where the output explicitness level falls below the predetermined threshold.

More specifically, the information converting unit 122 may determine the output method and the display style in accordance with the degree of importance and may determine the position where the notification information is put in accordance with the degree of urgency. For example, in the case where the degree of importance is higher than a first threshold, because the information is required to be reliably delivered to the user, the information converting unit 122 converts the notification information into an explicit display style such as push notification (dialog, annotation) to inside the field of view of the user. Meanwhile, in the case where the degree of importance is low, priority is placed on behavior or the field of view of the user being not interrupted, and the information converting unit 122 converts the notification information into a display style in which the notification information is fit in an environment around the user or in a world view presented by application by, for example, naturally displaying a virtual object which imitates a style of an actual letter on a desk of the user if the notification information is a message notification.

Further, in the case where the degree of urgency is higher than a second threshold, the information converting unit 122 disposes the notification information at a location (such as in front of the eyes of the user and near the user) where the user can easily find the information regardless of behavior or a current state of the user. In this event, the information converting unit 122 may encourage the user to notice the notification information immediately using sound along with display or by visuality of display. Meanwhile, in the case where the degree of urgency is low, the information converting unit 122 disposes the notification information at a location or converts the notification information into a display style such that the notification information is fit in (assimilated into) an environment (the scenery). By this means, it is possible to give a notification which waits until the user notices the notification without disturbing behavior of the user.

Upon determination of a location of the information, a point of gaze of the user can be referred to. The point of gaze of the user is a direction of a line of sight and includes a depth position in the case where a focal distance can be measured. The control unit 12 of the information processing apparatus 1 can calculate the point of gaze of the user by, for example, analyzing an image of the eyes of the user shot by the inward camera 111. The information converting unit 122 disposes notification information with a high degree of urgency at a position where the user can find the notification information in a short period of time, that is, near the point of gaze.

The output control unit 123 performs control so that the information converted by the information converting unit 122 is output from the display unit 13 or the speaker 14 in accordance with the determined parameter.

(Sensor Unit 11)

The sensor unit 11 has a function of acquiring various kinds of information relating to the user or the surrounding environment. For example, the sensor unit 11 includes the outward camera 110, the inward camera 111, a microphone 112, a gyro sensor 113, an acceleration sensor 114, an orientation sensor 115, a position measuring unit 116, and a biosensor 117. Note that specific examples of the sensor unit 11 described here are examples, and the present embodiment is not limited to these. Further, there may be provided a plurality of sensors as each of the sensors.

The outward camera 110 and the inward camera 111 each has a lens system constituted with an imaging lens, a diaphragm, a zoom lens, a focus lens, or the like, a driving system which causes the lens system to perform focus operation or zoom operation, a solid-state imaging element array which performs photoelectric conversion on imaging light obtained by the lens system to generate an imaging signal, or the like. The solid-state imaging element array may be realized with, for example, a charge coupled device (CCD) sensor array, or a complementary metal oxide semiconductor (CMOS) sensor array.

The microphone 112 picks up sound of the user or surrounding environmental sound and outputs the sound to the control unit 12 as sound data.

The gyro sensor 113, which is realized with, for example, a triaxial gyro sensor, detects angular velocity (rotation speed).

The acceleration sensor 114, which is realized with, for example, a triaxial acceleration sensor (also referred to as a "G sensor"), detects acceleration upon traveling.

The orientation sensor 115, which is realized with, for example, a triaxial geomagnetic sensor (compass), detects an absolute direction (orientation).

The position measuring unit 116 has a function of detecting a current position of the information processing apparatus 1 based on a signal acquired from outside. Specifically, for example, the position measuring unit 116, which is realized with a global positioning system (GPS) measuring unit, receives a radio wave from a GPS satellite, detects a position where the information processing apparatus 1 exists, and outputs the detected position information to the control unit 12. Further, the position measuring unit 116 may detect the position through transmission/reception with, for example, Wi-Fi (registered trademark), Bluetooth (registered trademark), a mobile phone, a PHS, a smartphone, or the like, or through near field communication, or the like, other than GPS.

The biosensor 117 detects biological information of the user. Specifically, for example, a heart rate, a body temperature, perspiration, a blood pressure, perspiration, pulse, breathing, palpebration, eyeball movement, a gazing period, a size of a pupil diameter, a blood pressure, a brain wave, body motion, a body position, a cutaneous temperature, electrical skin resistance, micro vibration (MV), myopotential, a blood oxygen saturation level ($SPO_2$)), or the like, can be detected.

(Display Unit 13)

The display unit 13 is realized with a lens unit (one example of the transmission type display unit) which performs display using, for example, a hologram optical technique, a liquid crystal display (LCD) apparatus, an organic light emitting diode (OLED) apparatus, or the like. Further, the display unit 13 may be a transmissive, a semi-transmissive or a non-transmissive unit.

(Speaker 14)

The speaker 14 reproduces a sound signal according to control by the control unit 12.

(Communication Unit 15)

The communication unit 15 is a communication module for transmitting/receiving data to/from other apparatuses in a wired/wireless manner. The communication unit 15 performs wireless communication with external equipment directly or through a network access point using a method such as, for example, a wired local area network (LAN), a wireless LAN, wireless fidelity (Wi-Fi, registered trademark), infrared communication, Bluetooth (registered trademark) and near field/non-contact communication.

(Storage Unit 17)

The storage unit 17 stores programs or parameters for the above-described control unit 12 to execute each function. For example, in the storage unit 17, various kinds of thresholds to be used by the explicitness level determination unit 121 for determination processing, parameters of output modes in accordance with explicitness levels, or the like, are stored.

(Operation Input Unit 16)

The operation input unit 16 is realized with an operation member having a physical structure, such as a switch, a button and a lever.

The configuration of the information processing apparatus 1 according to the present embodiment has been specifically described above. The configuration of the information processing apparatus 1 according to the present embodiment is not limited to the example illustrated in FIG. 2. For example, at least part of the processing of the control unit 12 of the information processing apparatus 1 may be performed on a server on cloud connected via the communication unit 15.

3. Operation Processing

Figure 3:
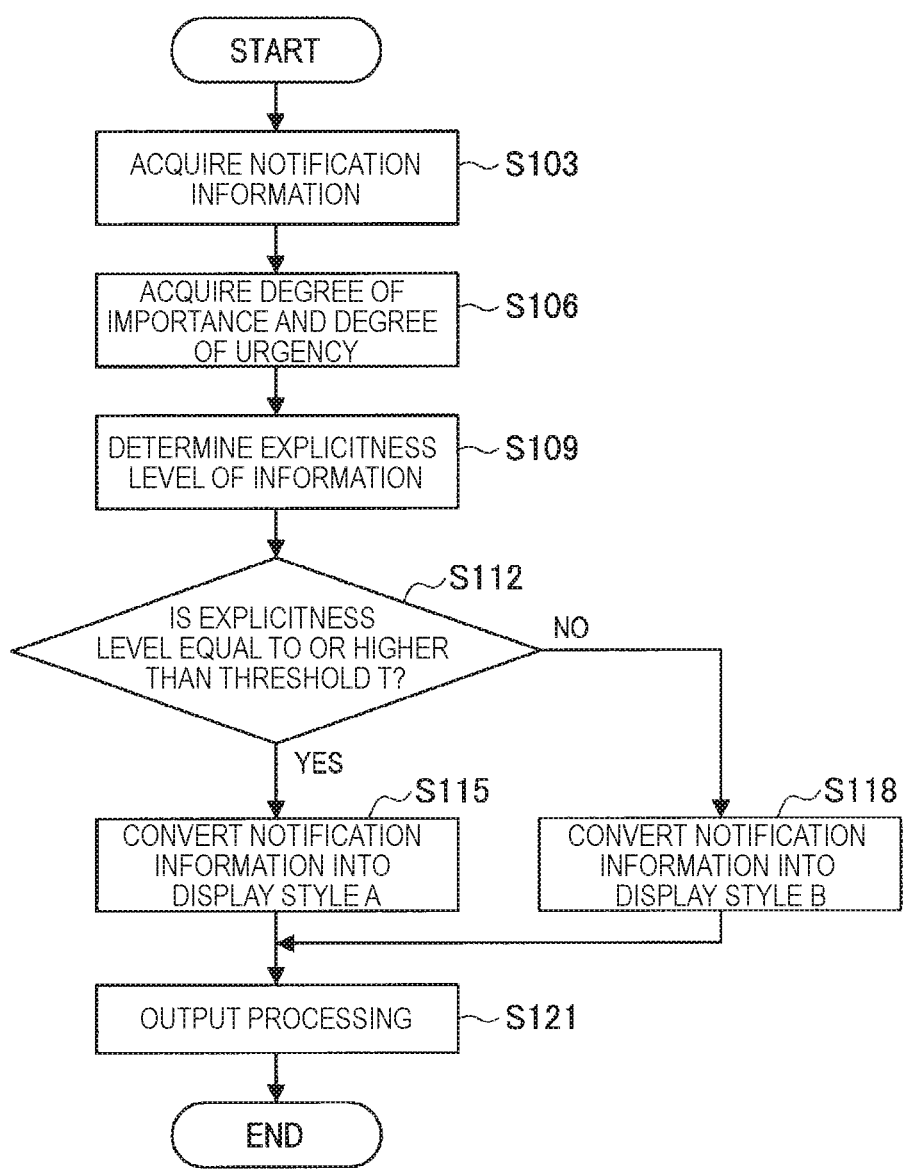
FIG. 3 is a flowchart illustrating output control processing according to the present embodiment.

FIG. 3 is a flowchart illustrating output control processing according to the present embodiment. As illustrated in FIG.

3, first, the control unit 12 of the information processing apparatus 1 acquires notification information by the notification information acquiring unit 120 (step S103). An output source of the notification information is assumed to be, for example, a server connected to the information processing apparatus 1 via a network or application running on the information processing apparatus 1.

The control unit 12 then acquires the degree of importance and the degree of urgency of the notification information by the explicitness level determination unit 121 (step S106), and determines an explicitness level (step S109). The explicitness level determination unit 121 may set at least one of the degree of importance and the degree of urgency of the notification information as the explicitness level or, in the case where a predetermined weight is set, may calculate the explicitness level while taking into account the weight. The degree of importance and the degree of urgency of the notification information may be set in advance by, for example, the output source of the notification information and embedded in the notification information as metadata.

An explicitness level calculation example will be described below.

In the case where a weight is set in advance by the output source or the user for each type of a degree of importance of the notification information, for example, an explicitness level $S_A$ of notification information of a certain type A can be calculated through the following equation 1. Here, the type of the degree of importance is "Fatal Error", "Error", "Notification", "Information" or "Log" indicated in the above-described Table 1. It is assumed that a weight of the type A is $w_A$, and a weight of the type B is $w_B$. Further, in the following equation 1, a is an arbitrary constant.

[Math. 1]

$$S_A = \alpha \cdot w_A \quad \text{Equation 1}$$

Further, in the case where a weight is set by the output source or the user in a similar manner also for each type of a degree of urgency of the notification information ("Urgent notification", "Steady notification, continuous state notification", "Regular notification, reference information notification", "Notification regarding location and object"), the explicitness level can be calculated in a similar manner while the weight is taken into account.

Further, the explicitness level determination unit 121 can calculate a final explicitness level through the following equation 2 using an explicitness level $S_1$ calculated on the basis of the degree of importance and an explicitness level $S_2$ calculated on the basis of the degree of urgency. In the following equation 2, it is assumed that weights of the respective explicitness levels are $w_1$ and $w_2$ (arbitrary constants).

[Math. 2]

$$S = S_1 \cdot w_1 + S_2 \cdot w_2 \quad \text{Equation 2}$$

Further, while the explicitness level determination unit 121 calculates a single explicitness level on the basis of the degree of importance and the degree of urgency using the above-described equation 2, the present embodiment is not limited to this, and the degree of importance and the degree of urgency may be respectively handled as different explicitness levels, and an output mode may be determined in accordance with a plurality of explicitness levels (the degree of importance and the degree of urgency) at the information converting unit 122 which will be described later. In this case, for example, the information converting unit 122 determines a display style (an explicit display style, a display style in which the notification information is assimilated into an environment) from the degree of importance and determines a display position (a position where the user can easily find the notification information, a position where the notification information does not disturb the field of view of the user such as a location distant from the user) from the degree of urgency.

The processing of determining the explicitness level on the basis of the degree of importance and the degree of urgency has been described in detail above.

Note that, in the case where the degree of importance and the degree of urgency of the notification information are not set in advance, the explicitness level determination unit 121 can determine the explicitness level (the degree of importance, the degree of urgency) on the basis of a current state of the user, an environment around the user, device conditions, a genre of the notification information, or the like.

The current state of the user can be analyzed on the basis of information detected by various kinds of sensors of the sensor unit 11. As the state of the user, for example, the following is assumed.

Behavior recognition result (still, walk, run, go up and down stairs, drive a car), moving speed (a moving state or moving speed of the user): the explicitness level determination unit 121 determines a lower explicitness level (the degree of importance, the degree of urgency) so as to prevent the notification from inhibiting behavior of the user in the case where the user is moving at high speed or in the case where an amount of exercise of the user is large. By this means, it is possible to output the notification information at a position distant from the user or in a display style in which the notification information is assimilated into an environment instead of outputting the notification information in front of the eyes of the user or at a position where the notification information disturbs the field of view, so that it is possible to prevent the notification information from inhibiting behavior of the user.

Biological information (a heart rate, a body temperature, perspiration, a blood pressure): a tension state or an amount of exercise of the user can be measured through analysis of biological information. The explicitness level determination unit 121 determines a lower explicitness level (the degree of importance, the degree of urgency) in the case where a degree of tension is high or the amount of exercise is large. By this means, it is possible to output the notification information at a position distant from the user or in a display style in which the notification information is assimilated into an environment instead of outputting the notification information in front of the eyes of the user or at a position where the notification information disturbs the field of view, so that it is possible to prevent the notification information from inhibiting behavior of the user.

The environment around the user can be analyzed on the basis of information detected by various kinds of sensors of the sensor unit 11. As the environment around the user, for example, the following is assumed.

Scenery (real space appearing in the field of view of the user): an object in real space can be extracted through analysis of an image shot by the outward camera 110. The explicitness level determination unit 121 determines a lower explicitness level, for example, in the case where important information is located in the scenery. By this means, it is possible to output the notification information at a position distant from the user or in a display style in which the notification information is assimilated into an environment, instead of outputting the notification information in front of the eyes of the user or at a position where the notification information disturbs the field of view, so that it is possible to prevent the notification information from inhibiting behavior of the user.

Location (indoor, outside), circumstances (whether or not there are other persons, cars, or the like, density): in the case where the user is located outside or in the case where there are other persons, cars, or the like, around the user, the explicitness level determination unit 121 determines a lower explicitness level. By this means, it is possible to output the notification information at a position distant from the user or in a display style in which the notification information is assimilated into an environment, instead of outputting the notification information in front of the eyes of the user or at a position where the notification information disturbs the field of view, so that it is possible to prevent the notification information from inhibiting behavior of the user.

The device conditions are conditions of a device (here, the information processing apparatus 1) which gives a notification of information, such as a remaining battery level and a size of a screen.

The genre of the notification information can be analyzed from metadata of the notification information. As the genre of the notification information, for example, news, weather, a message, an alarm, a notice, or the like, are assumed. The explicitness level determination unit 121 determines the explicitness level in accordance with the genre of the notification information or relevance between the genre and current behavior of the user. A genre for which the explicitness level is set high or low may be set, for example, on the basis of a weight for each genre set in advance by a system side or the user. Further, concerning the relevance between the genre and the current behavior of the user, for example, in the case where the user is located outside, the degree of importance for a genre of "weather" may be set higher, and, in the case where the user is getting on a train (still), the degree of importance for a genre of a "message" and "news" may be set higher (because it is assumed that the user has time for reading the message).

Determination of the explicitness level according to the present embodiment has been described above. Note that the explicitness level determination unit 121 according to the present embodiment may calculate an output explicitness level on the basis of at least one or more of the degree of importance, the degree of urgency and the genre of the notification information, a state of the user, and an environment around the user.

Subsequently, the information converting unit 122 performs processing of converting notification information in accordance with the explicitness level determined by the explicitness level determination unit 121. Specifically, for example, the information converting unit 122 determines a display style in accordance with whether or not the explicitness level exceeds an arbitrary threshold (step S112).

Then, in the case where the explicitness level is equal to or higher than a threshold T (step S112: Yes), the information converting unit 122 converts the notification information into a display style A (step S115). Meanwhile, in the case where the explicitness level is lower than the threshold T (step S112: No), the information converting unit 122 converts the notification information into a display style B (step S118).

Note that a plurality of thresholds may be set. For example, the information converting unit 122 may determine a display style in which the notification information is converted on the basis of a plurality of criteria for determination such as whether or not the degree of importance as the explicitness level exceeds a threshold T1 and whether or not the degree of urgency as the explicitness level exceeds a threshold T2.

Further, the information converting unit 122 may further adjust various kinds of parameters of the display style while taking into account a current state of the user and an environment around the user.

The output control unit 123 then performs control to output information converted by the information converting unit 122 using a corresponding output method (for example, display output from the display unit 13, sound output from the speaker 14) (step S121). Note that, while not illustrated in FIG. 2, output control may be tactile presentation control from a vibrating unit such as a vibrator.

4. Output Examples of Notification Information

Subsequently, output examples of the notification information according to the present embodiment will be described with reference to FIG. 4 to FIG. 8. Here, as an example, output examples using the output style determined on the basis of a plurality of explicitness levels, that is, the degree of importance and the degree of urgency will be described. The information converting unit 122 can determine the output style as indicated in the following Table 3 on the basis of whether the degree of importance is high or low and whether the degree of urgency is high or low.

TABLE 3

| ▲High<br><br>Degree<br>of<br>importance<br><br>▼Low | ▲High<br>Degree<br>of<br>urgency<br>▼Low | Explicit<br>output | first output style<br>second output style<br>third output style |
|---|---|---|---|
| | ▲High<br>Degree<br>of<br>urgency<br>▼Low | Output<br>assimilated<br>into<br>environment | fourth output style<br>fifth output style<br>sixth output style |

<4-1. Example of Explicit Output>
(4-1-1. First Output Mode)

For example, the information converting unit 122 determines a first output mode for performing explicit output in the case where the degree of importance is higher than a first threshold and the degree of urgency is higher than a second threshold. In the first output mode, for example, a notification is given using a UI in related art such as, for example, a dialog and annotation.

(4-1-2. Second Output Mode)

Further, in the case where the degree of importance is higher than the first threshold, and the degree of urgency is between the second threshold and a third threshold (the second threshold>the degree of urgency>the third threshold), the information converting unit 122 determines a second output mode which is another example of the explicit output. In the second output mode, a forcible notification in which sound and visual output are combined is given.

Specifically, the second output mode is "a mode in which a notification of information is given using sound while a UI of running application is hidden", "a mode in which a notification of information is given by a dialog, or the like, of the notification being overlay displayed while a UI of running application is made semi-transmissive and by using sound", or "a mode in which a notification of information is given by a dialog, or the like, of the notification being overlay displayed while a UI of running application remains unchanged". As the notification information to be overlay displayed, in addition to a UI in related art such as a dialog, a virtual object (virtual object) which can float in the field of view such as a drone and a character floating in air may be used. As the virtual object, an object which is common as a system may be prepared, or a character set in running application may be used. Further, processing on a UI of the running application (hiding the UI, making the UI semi-transmissive, not changing the UI) may be made different in accordance with a degree of importance of the information. Still further, while it is desired that the notification information includes text and sound, in the case where the notification information includes only text, conversion to sound (synthesis of sound) is performed by text analysis being performed by the information converting unit 122.

Here, FIG. 4 illustrates a diagram explaining the second output mode according to the present embodiment. The example illustrated in FIG. 4 corresponds to a "mode in which a notification of information is given using sound while a UI of running application is hidden" among the above-described second output mode. Further, in the example illustrated in FIG. 4, a field of view via the display unit 13 which is a transmissive display provided at a lens portion of a glasses-type wearable apparatus worn by the user is illustrated. In the field of view, a steering wheel 20 of a bicycle appears.

As illustrated in an upper part of FIG. 4, if notification information is acquired when, for example, a virtual character 30 which is a UI of application (for example, bicycle application) which is currently running is augmented reality (AR) displayed in front, as illustrated in a lower part of FIG. 4, a notification of information ("a message from Mr. Y") can be given using sound 50 while the virtual character 30 is hidden.

By this means, it is possible to realize a forcible notification which enables the user to notice the notification information regardless of what the user is doing.

(4-1-3. Third Output Mode)

Then, in the case where the degree of importance is higher than the first threshold, and the degree of urgency is lower than the third threshold, the information converting unit 122 determines a third output mode which performs explicit output. In the third output mode, a notification is given by the information being disposed in empty space in an environment around the user.

Specifically, the information converting unit 122 expands the notification information in flat space such as on a wall surface, a desk and a road surface located around the user to dispose (text or an image which is content of the notification information). By this means, the user can grasp the content of the notification information without performing special operation. The flat space can be detected from Depth information obtained through analysis of the shot images acquired by a plurality of outward cameras 110 or through image recognition.

Because the degree of urgency is low, the information may be viewed by the user at any timing. The user can perform interaction such as browsing in detail and response when the user has time after the user visually confirms content of the information.

Figure 5:
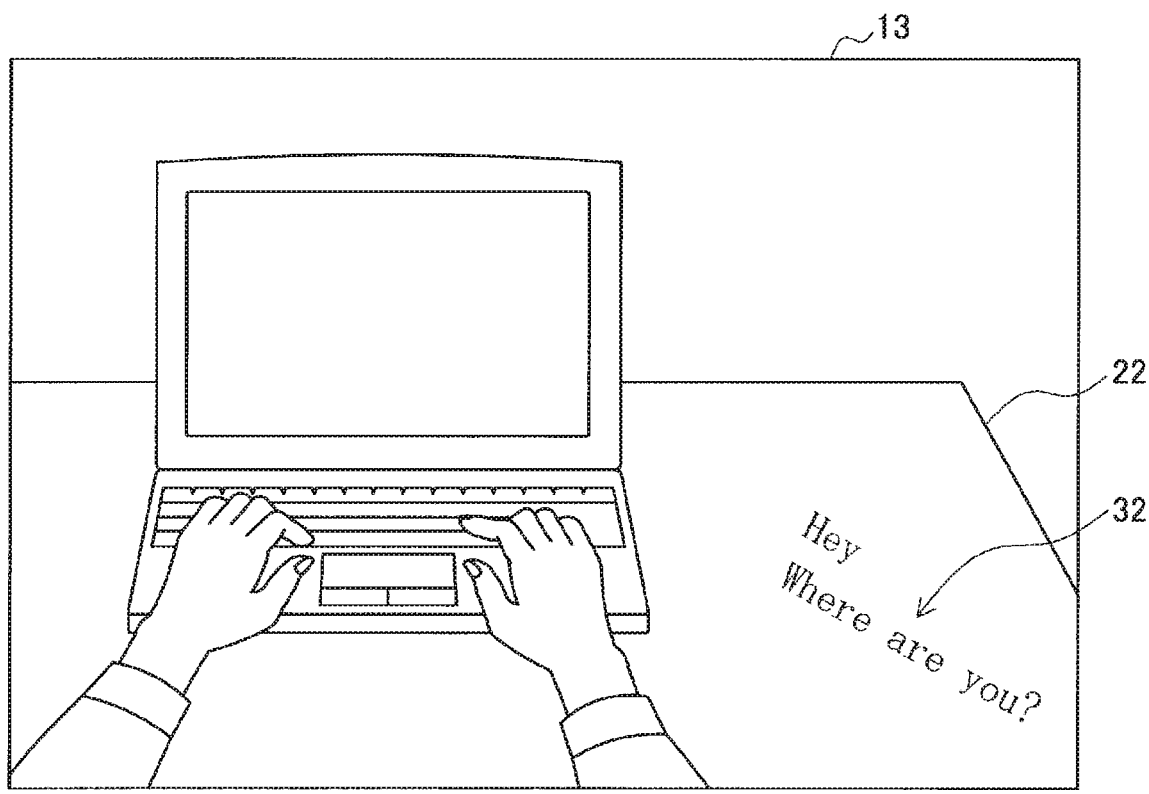
FIG. 5 is a diagram explaining a third output mode according to the present embodiment.

Here, FIG. 5 illustrates a diagram explaining the third output mode according to the present embodiment. According to the third output mode, as illustrated in FIG. 5, for example, when the user operates a personal computer (PC), notification information 32 is AR displayed in flat space of a desk 22 (real object). The notification information 32 is displayed in an overlapped manner along the flat space of the desk 22. Although the user does not notice the notification information 32 immediately because the user focuses on the PC, the notification information 32 expanded on the desk 22 can come to notice of the user in the case where the user has time to spare. Because the degree of importance is high, the notification information 32 is put into a state where the user can confirm content without performing operation.

<4-2. Examples of Output Assimilated into Environment>

Subsequently, examples of output assimilated into environment (fourth to sixth output examples) in the case where the degree of importance is lower than the first threshold will be described. An output method in which notification information is assimilated into an environment can be set while, for example, the following points are taken into account.

(1) Application dependence (realizing continuation of a world view)
(2) Arrangement in accordance with a position of a real object (such as on a desk and a note image which looks as if it is stuck on a wall)
(3) Color, a size, motion of a notification information image in accordance with an environment (scenery, color shade)
(4) A notification information image (virtual object) is not odd in real space (for example, it is odd that text information such as characters or only an icon is present in the scenery)

The examples will be specifically described below with reference to FIG. 6 to FIG. 8.

(4-2-1. Fourth Output Mode)

In the case where the degree of importance is lower than the first threshold, and the degree of urgency is higher than the second threshold, the information converting unit 122 determines a fourth output mode in which the notification information is output while the notification information is assimilated into an environment. In the fourth output mode, the user is notified of information without a world view of running application being harmed. The user is notified of the information without atmosphere of application being harmed by a role for notification in accordance with the world view of application being set, for example, in the case where bicycle application is running, by a messenger who rides on a bicycle appearing and notifying the user of the information using sound, in the case where the user is playing a game, by a character (avatar) set in the game appearing and notifying the user of the information using sound, or in the case where the user is working using word processing application, by a circulated memo being made to appear. In this case, the control unit 12 may output the notification information to the application side and notify the user of the information using a unique character, or the like, at an appropriate timing in the application as processing of the application.

Here, FIG. 6 illustrates a diagram explaining the fourth output mode according to the present embodiment. As illustrated in an upper part in FIG. 6, for example, when a virtual character 30 which is a UI of bicycle application which is currently running is augmented reality (AR) displayed in front, as illustrated in a middle part in FIG. 6, a messenger 34 who rides on a bicycle is made to appear. Then, as illustrated in a lower part in FIG. 6, control is performed so that the messenger 34 gives a notification of the information using sound 52. Because the information notified here has a high degree of urgency, as illustrated in FIG. 6, content of the information can be expanded as "I will read a message from Mr. Y. "schedule for tomorrow is . . . "".

(4-2-2. Fifth Output Mode)

Then, in the case where the degree of importance is lower than the first threshold, and the degree of urgency is between the second threshold and the third threshold (the second threshold>the degree of urgency>the third threshold), the information converting unit 122 determines a fifth output mode in which the notification information is output while the notification information is assimilated into an environment. In the fifth output mode, an iconic object which indicates a notification is disposed within an environment. Specifically, a virtual object with which interaction can be performed such as, for example, a shining crystal or a treasure box and a break of space-time is disposed in the environment, and, in the case where the user performs interaction with respect to the virtual object (performs gesture of touching the crystal, or the like, moving to a location where the object is placed, peeps into the break of space-time, or the like), content of the notification information is expanded. Here, because the degree of importance is low, while the notification information is displayed using a display method in which the notification information is assimilated into an environment, because the notification information has a medium degree of urgency, a notification is emphasized by being displayed as a virtual object in a shape which somewhat attracts attention of the user. These virtual objects can be set as common virtual objects on the present system side regardless of application.

Here, FIG. 7 illustrates a diagram explaining the fifth output mode according to the present embodiment. As illustrated in an upper part in FIG. 7, for example, in the case where a shining crystal 36 is disposed in an ambient environment, and the user performs some kind of interaction with respect to the crystal 36, as illustrated in a lower part in FIG. 7, an image 38 in which information content is expanded is displayed. Here, because the notified information has a medium degree of urgency, as illustrated in the upper part in FIG. 7, the a notification is made to the user while the user is not notified of the information content, and, in the case where the user performs interaction, the information content is expanded.

(4-2-3. Sixth Output Mode)

Subsequently, in the case where the degree of importance is lower than the first threshold, and the degree of urgency is lower than the third threshold, the information converting unit 122 determines a sixth output mode in which the notification information is output while the notification information is assimilated into an environment. In the sixth output mode, the notification information is fit in an environment using a shape of an object which can exist in real space. Specifically, control is performed so that content of the notification is expanded in space using a virtual object in a shape of a real object such as, for example, a sticky note, a note and a letter. The user can understand information content without special operation. What kind of virtual object is used can be determined in accordance with, for example, a genre of the notification information. For example, if the genre of the notification information is a "message", a sticky note, a memo pad, a letter, or the like, is used, if the genre is "schedule information", a calendar is used, and if the genre is "news", a newspaper or a leaflet is used.

Figure 8:
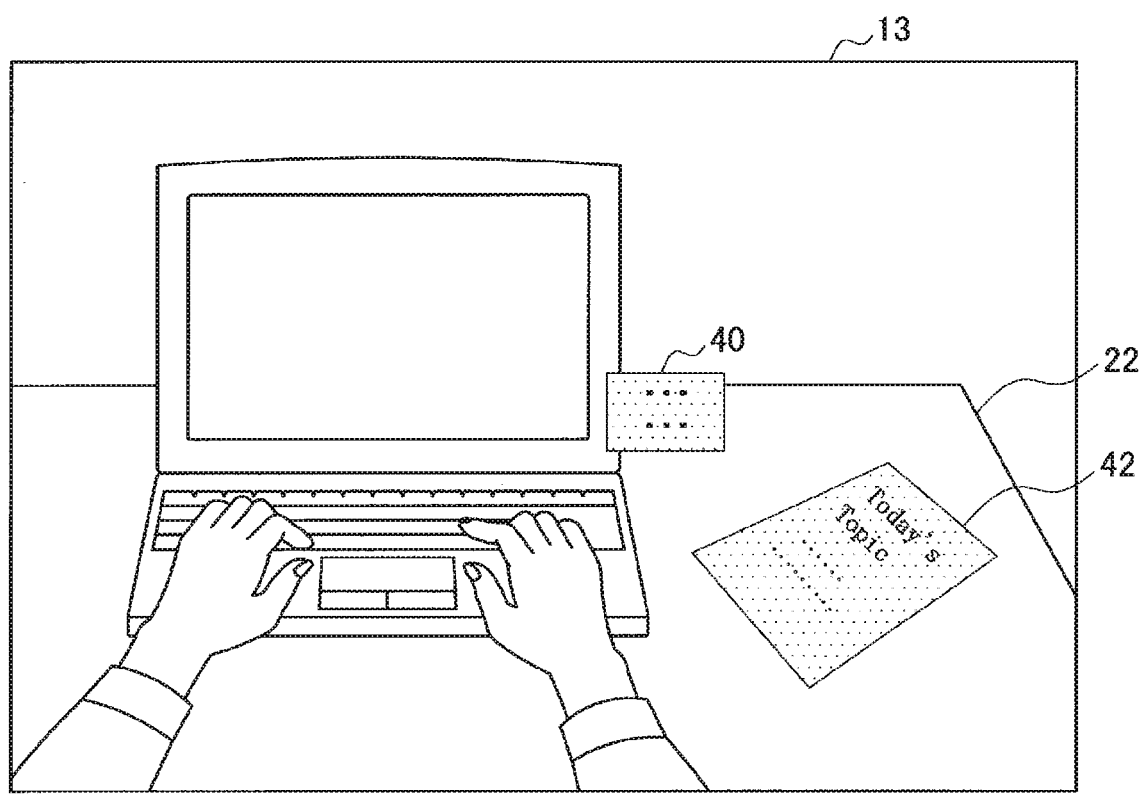
FIG. 8 is a diagram explaining a sixth output mode according to the present embodiment.

Here, FIG. 8 illustrates a diagram explaining the sixth output mode according to the present embodiment. According to the sixth output mode, as illustrated in FIG. 8, for example, when the user operates a personal computer (PC), AR display is performed by a sticky note 40 (virtual object) being stuck on the PC (real object), or paper 42 (virtual object) being placed on a desk 22 (real object).

The notification information handled in the present example is notification information with a low degree of urgency which may be viewed by the user at any timing. Presentation of the information comes to notice of the user, and the user can perform interaction such as browsing in detail and response when the user has time to spare. The display assumes a case where an amount of movement of the user is small or a case where display is performed in determined space such as office.

Note that, even if some kind of application is running, the user can be notified of the information in a similar manner in a style such as a sticky note and a note. In the case where there are a number of notifications, it is also possible to present only a predetermined number of the latest notifications. Further, the control unit 12 may recognize motion of the hand of the user and may perform display control so as to allow the user to pick up and confirm the sticky note 40 or the paper 42. Further, if the control unit 12 detects that the user picks up and confirms the sticky note 40 or the paper 42 and gazes for a certain period, the control unit 12 may shift a mode to a mode in which response is possible (response is realized through, for example, sound input by a microphone 112) to accept conversion from the user or may delete the sticky note 40 or the paper 42 if a certain period has elapsed since confirmation.

5. Conclusion

As described above, according to the information processing apparatus 1 according to the embodiment of the present disclosure, it is possible to improve usability by converting an output style of notification information.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, a ROM and a RAM incorporated in the above-described information processing apparatus 1 to exert functions of the information processing apparatus 1. Further, a computer readable storage medium which has the computer program stored therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a determination unit configured to determine an output explicitness level of notification information to a user; and an output control unit configured to perform control such that the notification information is output in an output mode according to the determined output explicitness level, in which the output control unit performs control such that the notification information is output in a display mode of assimilating the notification information into a display environment in accordance with the output explicitness level.

(2)

The information processing apparatus according to (1), further including:

a converting unit configured to convert an output mode of the notification information in accordance with the output explicitness level.

(3)

The information processing apparatus according to (2), in which the converting unit performs conversion into a display mode of explicitly notifying of the notification information in a case where the output explicitness level exceeds a predetermined threshold, and the converting unit performs conversion into a display mode of assimilating the notification information into a display environment in a case where the output explicitness level falls below a predetermined threshold.

(4)

The information processing apparatus according to any one of (1) to (3), in which the output explicitness level is based on at least any of a degree of importance and a degree of urgency of the notification information.

(5)

The information processing apparatus according to any one of (1) to (4), in which the output explicitness level is based on at least any of a state of the user and an environment around the user.

(6)

The information processing apparatus according to any one of (1) to (5), in which the determination unit determines the output explicitness level on a basis of at least any one or more of a degree of importance and a degree of urgency of the notification information, a state of the user, an environment around the user, and a device condition.

(7)

The information processing apparatus according to any one of (4) to (6), in which the determination unit determines the output explicitness level while taking into account a weight for each user.

(8)

The information processing apparatus according to any one of (2) to (7), in which the display mode includes a display style, a display position, and a display timing.

(9)

The information processing apparatus according to (8), in which the display style is control of transmittance of display, color of display or a display size, utilization of display of a character, or utilization of display of an icon.

(10)

The information processing apparatus according to (8), in which the converting unit determines a display style in accordance with a degree of importance of the notification information and determines a display position in accordance with a degree of urgency of the notification information.

(11)

The information processing apparatus according to any one of (2) to (10), in which the output control unit performs control such that the converted notification information is output to a transmissive display of a glasses-type wearable terminal.

(12)

The information processing apparatus according to (11), in which the converting unit assimilates the notification information into a display environment by disposing the notification information in accordance with a position of a real object seen via the transmissive display.

(13)

The information processing apparatus according to (11), in which the determination unit determines a degree of importance and a degree of urgency of the notification information as the output explicitness level, and in a case where the degree of importance exceeds a first threshold and the degree of urgency exceeds a second threshold, the converting unit hides a displayed image of running application and performs conversion into an explicit output mode of notifying of the notification information by using sound.

(14)

The information processing apparatus according to (11), in which the determination unit determines a degree of importance and a degree of urgency of the notification information as the output explicitness level, and in a case where the degree of importance exceeds a first threshold and the degree of urgency falls below a second threshold, the converting unit performs conversion into an explicit output mode of displaying the notification information on a plane of a real object around the user.

(15)

The information processing apparatus according to (11), in which the determination unit determines a degree of importance and a degree of urgency of the notification information as the output explicitness level, and in a case where the degree of importance falls below a first threshold and the degree of urgency exceeds a second threshold, the converting unit performs conversion into an output mode of assimilating the notification information into a display environment in which the user is notified of the notification information through display or sound, by using a virtual object based on running application.

(16)

The information processing apparatus according to (11), in which the determination unit determines a degree of importance and a degree of urgency of the notification information as the output explicitness level, and in a case where the degree of importance falls below a first threshold and the degree of urgency is between a second threshold and a third threshold which is lower than the second threshold, the converting unit performs conversion into an output mode of assimilating the notification information into a display environment in which a virtual object is disposed in a scenery seen via the transmissive display and the user is notified of the notification information through display or sound in a case where the virtual object is selected by the user.

(17)

The information processing apparatus according to (11), in which the determination unit determines a degree of importance and a degree of urgency of the notification information as the output explicitness level, and in a case where the degree of importance falls below a first threshold and the degree of urgency falls below a third threshold, the converting unit performs conversion into an output mode of assimilating the notification information into a display environment in which a virtual object for displaying the notification information at a position corresponding to a real object around the user is disposed.

(18)
An information processing method including, by a processor:
determining an output explicitness level of notification information to a user; and
performing control such that the notification information is output in an output mode according to the determined output explicitness level,
in which the control includes performing control such that the notification information is output in a display mode of assimilating the notification information into a display environment.

(19)
A program causing a computer to function as:
a determination unit configured to determine an output explicitness level of notification information to a user; and
an output control unit configured to perform control such that the notification information is output in an output mode according to the determined output explicitness level,
in which the output control unit performs control such that the notification information is output in a display mode of assimilating the notification information into a display environment in accordance with the output explicitness level.

REFERENCE SIGNS LIST 1 information processing apparatus
12 control unit
120 notification information acquiring unit
121 explicitness level determination unit
122 information converting unit
123 output control unit
11 sensor unit
110 outward camera
111 inward camera
112 microphone
113 gyro sensor
114 acceleration sensor
115 orientation sensor
116 position measuring unit
117 biosensor
13 display unit
14 speaker
15 communication unit
16 operation input unit
17 storage unit

The invention claimed is:
1. An information processing apparatus, comprising:
at least one processor configured to:
determine whether a degree of importance of notification information falls below a first threshold or exceeds the first threshold;
determine a degree of urgency of the notification information exceeds a second threshold;
set, based on the determination that the degree of importance of the notification information falls below the first threshold and the determination that the degree of urgency of the notification information exceeds the second threshold, an output mode of a see-through display to an assimilating output mode;
set, based on the determination that the degree of importance of the notification information exceeds the first threshold, the output mode to an explicit output mode;
control, in a case where the output mode is set to the assimilating output mode, the see-through display to assimilate an augmented reality object corresponding to the notification information into a real space; and
control, in a case where the output mode is set to the explicit output mode, the see-through display to display a notification image different from the augmented reality object,
wherein the notification image includes at least one of a dialog image, an annotation image, a text image, or an icon image each corresponding to the notification information.

2. The information processing apparatus according to claim 1, wherein the at least one processor is further configured to control a glasses-type wearable display as the see-through display.

3. The information processing apparatus according to claim 1, wherein the at least one processor is further configured to position the augmented reality object in accordance with a position of a real object seen via the see-through display.

4. The information processing apparatus according to claim 1, wherein the at least one processor is configured to:
determine whether the degree of importance exceeds the first threshold and the degree of urgency of the notification information falls below the second threshold; and
based on the determination that the degree of importance exceeds the first threshold and the degree of urgency falls below the second threshold, set the output mode to the explicit output mode to display the notification image on a plane of the real space.

5. The information processing apparatus according to claim 1, wherein
the augmented reality object, which is assimilated in accordance with the assimilating output mode, is an object that does not indicate the notification information directly, and
the at least one processor is further configured to:
determine whether a user of the see-through display interacts with the augmented reality object; and
based on the determination that the user of the see-through display interacts with the augmented reality object, control the see-through display to display an image indicating the notification information directly instead of the augmented reality object.

6. The information processing apparatus according to claim 1, wherein
the augmented reality object, which is assimilated in accordance with the assimilating output mode, is an object having an appearance corresponding to a first real object associated with a category of the notification information, and
the at least one processor is further configured to arrange the augmented reality object on a second real object associated with the first real object.

7. An information processing method, comprising:
determining whether a degree of importance of notification information falls below a first threshold or exceeds the first threshold;
determining a degree of urgency of the notification information exceeds a second threshold;
setting, based on the determination that the degree of importance of the notification information falls below the first threshold and the determination that the degree of urgency of the notification information exceeds the second threshold, an output mode of a see-through display to an assimilating output mode;

setting, based on the determination that the degree of importance of the notification information exceeds the first threshold, the output mode to an explicit output mode;

controlling, in a case where the output mode is set to the assimilating output mode, the see- through display to assimilate an augmented reality object corresponding to the notification information into a real space; and controlling, in a case where the output mode is set to the explicit output mode, the see-through display to display a notification image different from the augmented reality object, wherein the notification image includes at least one of a dialog image, an annotation image, a text image, or an icon image each corresponding to the notification information.

8. A non-transitory computer-readable medium having stored thereon, computer-executable instructions, which when executed by a processor, cause the processor to execute operations, the operations comprising:

determining whether a degree of importance of notification information falls below a first threshold or exceeds the first threshold;

determining a degree of urgency of the notification information exceeds a second threshold;

setting, based on the determination that the degree of importance of the notification information falls below the first threshold and the determination that the degree of urgency of the notification information exceeds the second threshold, an output mode of a see-through display to an assimilating output mode;

setting, based on the determination that the degree of importance of the notification information exceeds the first threshold, the output mode to an explicit output mode;

controlling, in a case where the output mode is set to the assimilating output mode, the see- through display to assimilate an augmented reality object corresponding to the notification information into a real space; and controlling, in a case where the output mode is set to the explicit output mode, the see-through display to display a notification image different from the augmented reality object, wherein the notification image includes at least one of a dialog image, an annotation image, a text image, or an icon image each corresponding to the notification information.

9. An information processing apparatus, comprising:
at least one processor configured to:

determine an output explicitness level of notification information to a user based on a degree of importance and a degree of urgency of the notification information;

control output of the notification information in an output mode according to the determined output explicitness level;

control the output of the notification information in a display mode in which the notification information is assimilated into a display environment in accordance with the output explicitness level;

convert the output mode of the notification information in accordance with the output explicitness level;

control the output of the notification information to a transmissive display of a glasses- type wearable terminal; and in a case where the degree of importance exceeds a first threshold and the degree of urgency exceeds a second threshold:

control the transmissive display to hide a displayed image of a running application; and convert the output mode into an explicit output mode to notify the notification information by sound.

10. An information processing apparatus, comprising:
at least one processor configured to:

determine whether a degree of importance of notification information falls below a first threshold or exceeds the first threshold;

determine a degree of urgency of the notification information exceeds a second threshold;

set, based on the determination that the degree of importance of the notification information falls below the first threshold, an output mode of an output device to an assimilating output mode,
wherein the output device includes a see-through display and a microphone;

set, based on the determination that the degree of importance of the notification information exceeds the first threshold and the determination that the degree of urgency of the notification information exceeds the second threshold, the output mode to an explicit output mode to notify the notification information by sound;

control, in a case where the output mode is set to the assimilating output mode, the see-through display to assimilate an augmented reality object corresponding to the notification information into a real space; and control, in a case where the output mode is set to the explicit output mode, the microphone to notify the notification information by the sound.

11. The information processing apparatus according to claim 10, wherein the at least one processor is further configured to control the see-through display to hide the augmented reality object, based on the determination that the degree of importance exceeds the first threshold and the determination that the degree of urgency exceeds the second threshold.

* * * * *